(12) United States Patent
Basit

(10) Patent No.: US 12,275,103 B2
(45) Date of Patent: Apr. 15, 2025

(54) WELDING TORCH ASSEMBLY DEVICE

(71) Applicant: NASARC TECHNOLOGIES INC., Waterloo (CA)

(72) Inventor: Nauman Basit, Waterloo (CA)

(73) Assignee: NASARC TECHNOLOGIES INC., Waterloo (CA)

( * ) Notice: Subject to any disclaimer, the term of this patent is extended or adjusted under 35 U.S.C. 154(b) by 947 days.

(21) Appl. No.: 17/291,420

(22) PCT Filed: Nov. 5, 2019

(86) PCT No.: PCT/CA2019/051572
§ 371 (c)(1),
(2) Date: May 5, 2021

(87) PCT Pub. No.: WO2020/093151
PCT Pub. Date: May 14, 2020

(65) Prior Publication Data
US 2022/0001480 A1    Jan. 6, 2022

(30) Foreign Application Priority Data
Nov. 5, 2018 (CA) .............................. CA 3023108

(51) Int. Cl.
*B23K 9/32* (2006.01)
*B23K 9/28* (2006.01)

(52) U.S. Cl.
CPC ................ *B23K 9/323* (2013.01); *B23K 9/28* (2013.01); *B23K 9/325* (2013.01)

(58) Field of Classification Search
CPC ........ B23K 9/1336; B23K 9/173; B23K 9/28; B23K 9/287; B23K 9/32; B23K 9/323;
(Continued)

(56) References Cited

U.S. PATENT DOCUMENTS 4,998,606 A * 3/1991 McCormick ........... B25J 19/063
464/36
7,854,615 B1 * 12/2010 Kachline ................ B23K 9/323
439/13
(Continued)

FOREIGN PATENT DOCUMENTS

CA    2677352 A1    8/2008
CA    2800451 A1    11/2011
(Continued)

OTHER PUBLICATIONS

Extended European Search Report issued in EP19882001 dated Jul. 4, 2022, 7 pages.
(Continued)

Primary Examiner — Brian W Jennison
(74) Attorney, Agent, or Firm — Tucker Ellis LLP

(57) ABSTRACT

A welding torch assembly device comprising a revolution power connector (RPC) directly connectable to a power cable and electrically connectable to a neck of a welding torch, and a torch connector assembly for accommodating the RPC is provided. The welding torch assembly device may include an infinite rotation module with a shock sensor for allowing infinite rotation connection with a cable. The welding torch neck may be connected to the torch connector via a handnut.

18 Claims, 19 Drawing Sheets

(58) Field of Classification Search
CPC ...... B23K 9/325; H01R 13/111; H01R 35/04; H01R 39/64
See application file for complete search history.

(56) References Cited

U.S. PATENT DOCUMENTS

| | | | |
|---|---|---|---|
| 2008/0188093 A1* | 8/2008 | Jaeger ............... | H01R 35/04 439/13 |
| 2010/0012637 A1* | 1/2010 | Jaeger ............... | B23K 9/323 219/136 |
| 2015/0114943 A1* | 4/2015 | Oberndorfer ......... | H01R 9/11 219/137.62 |

FOREIGN PATENT DOCUMENTS

| | | |
|---|---|---|
| CA | 3030390 A1 | 2/2018 |
| DE | 102013012693 A1 | 2/2015 |
| JP | 5147622 B2 | 2/2013 |

OTHER PUBLICATIONS

International Search Report & Written Opinion in PCT/CA2019/051572 dated Jan. 16, 2020, 9 pages.

* cited by examiner

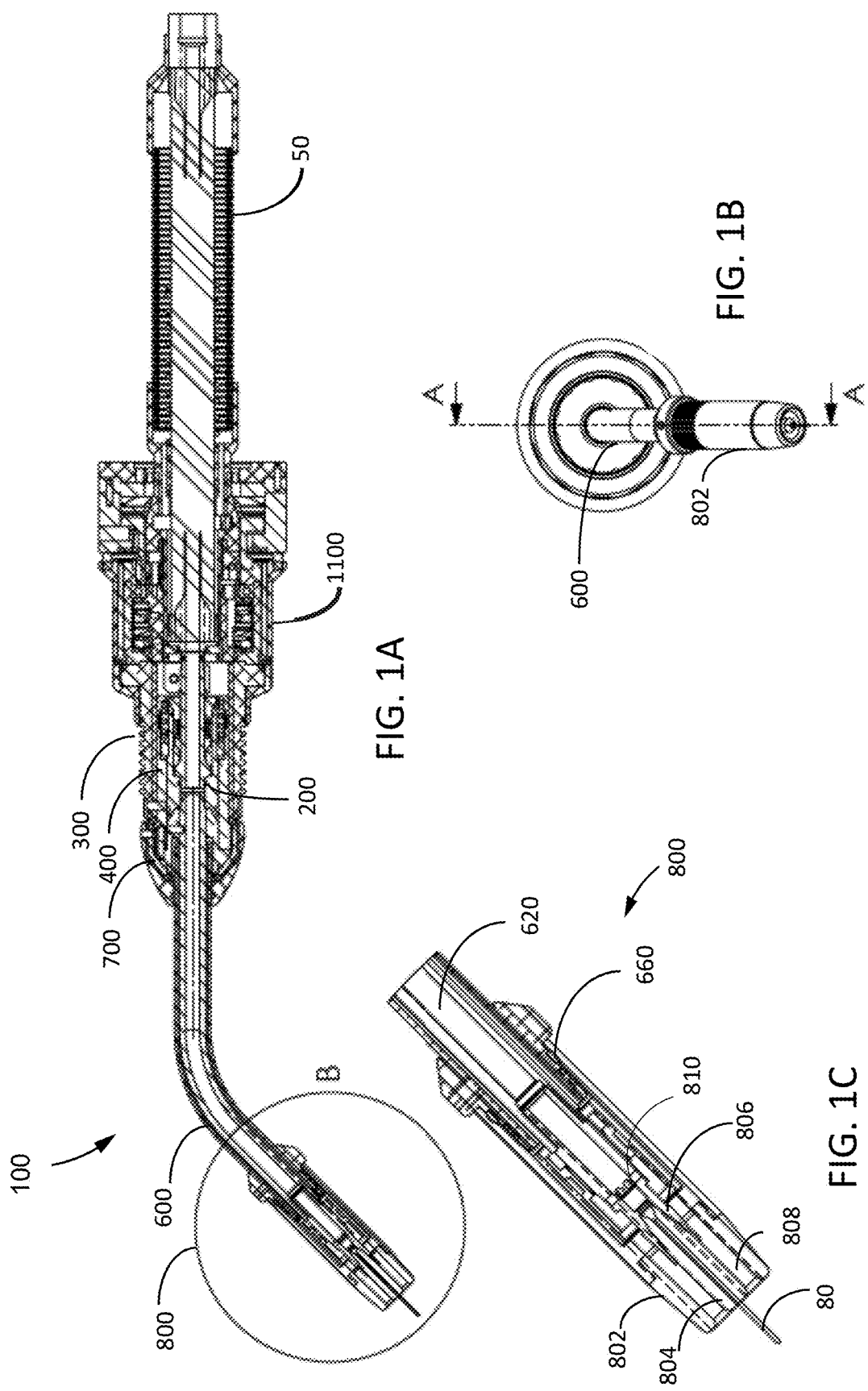

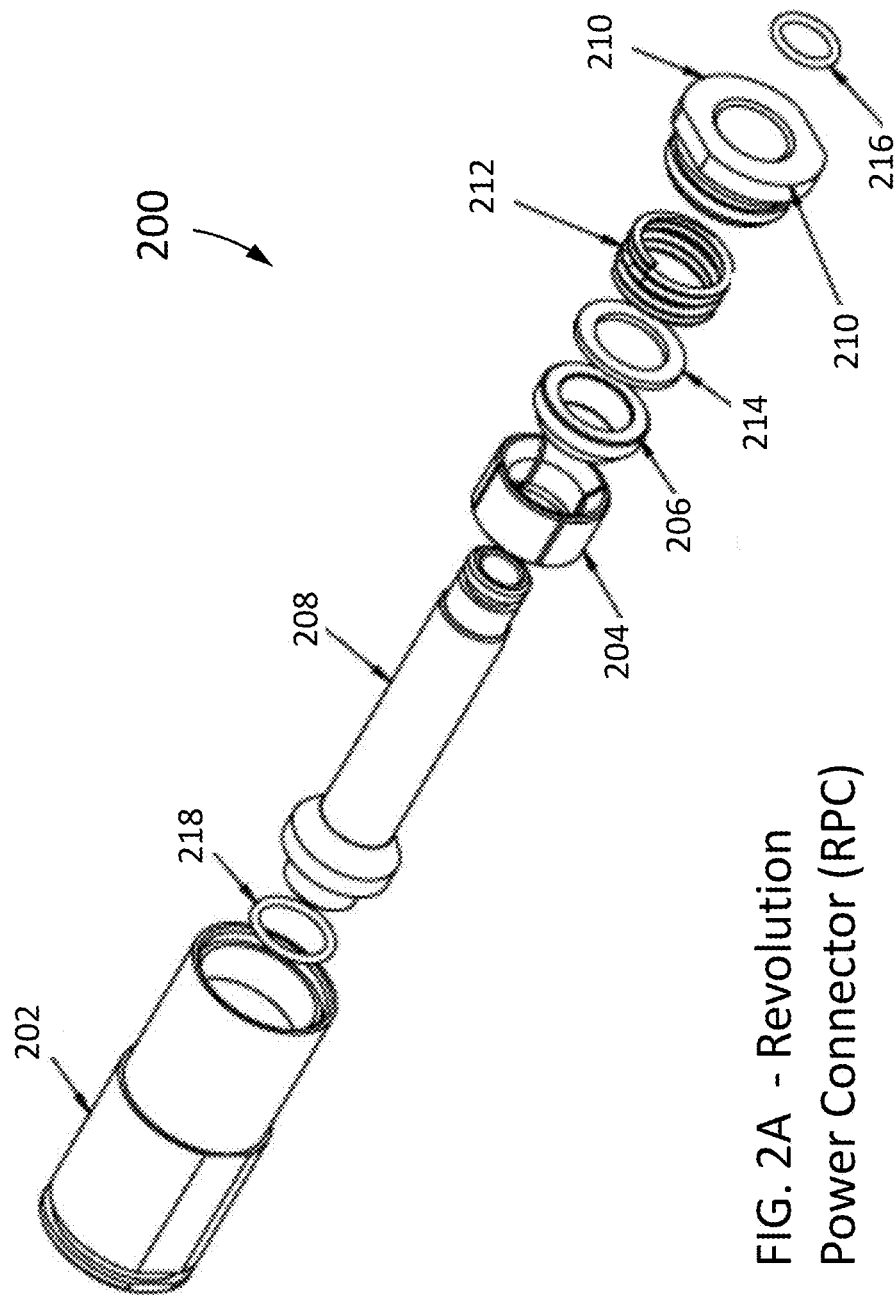
FIG. 2A - Revolution Power Connector (RPC)

FIG. 2C (RPC)

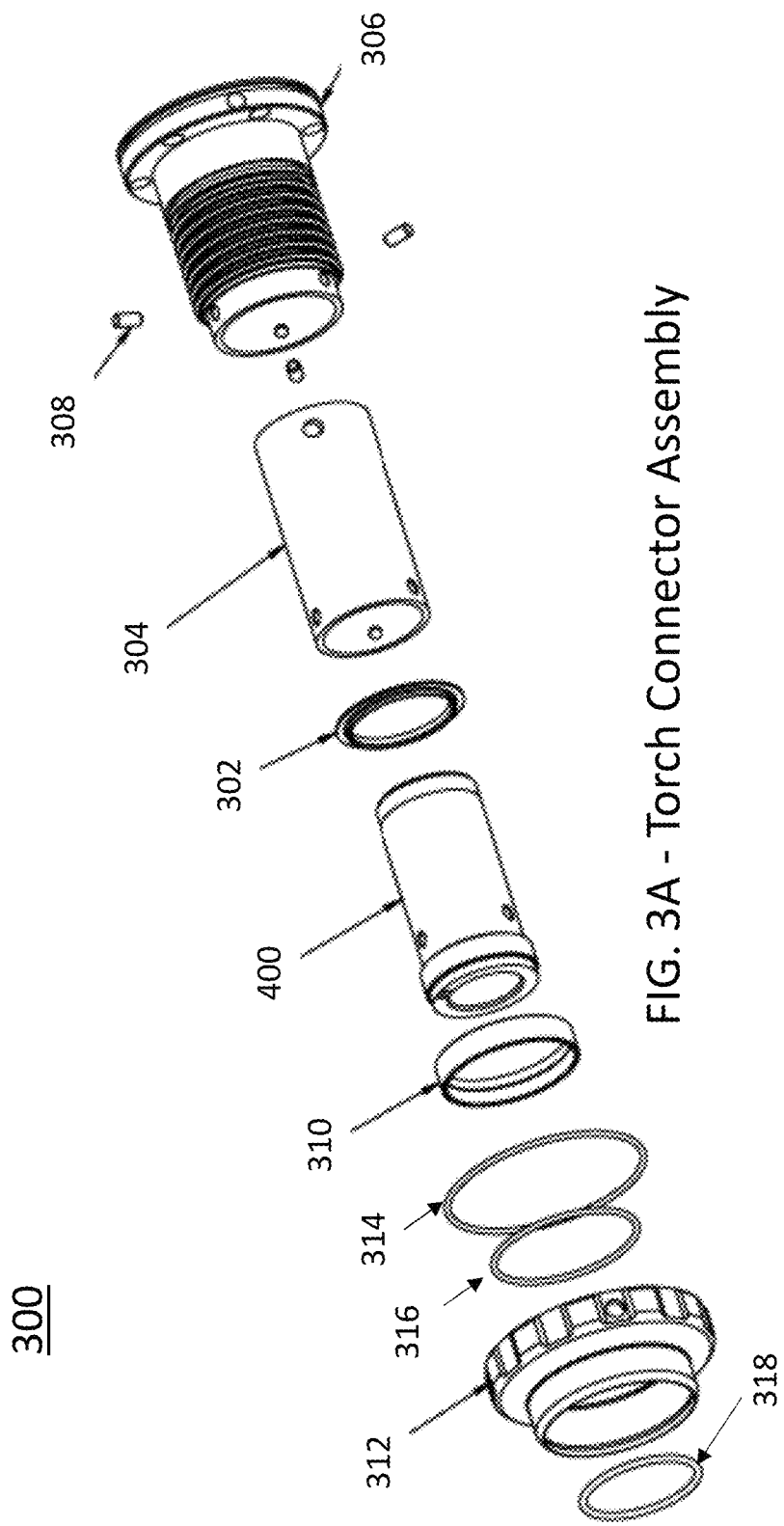

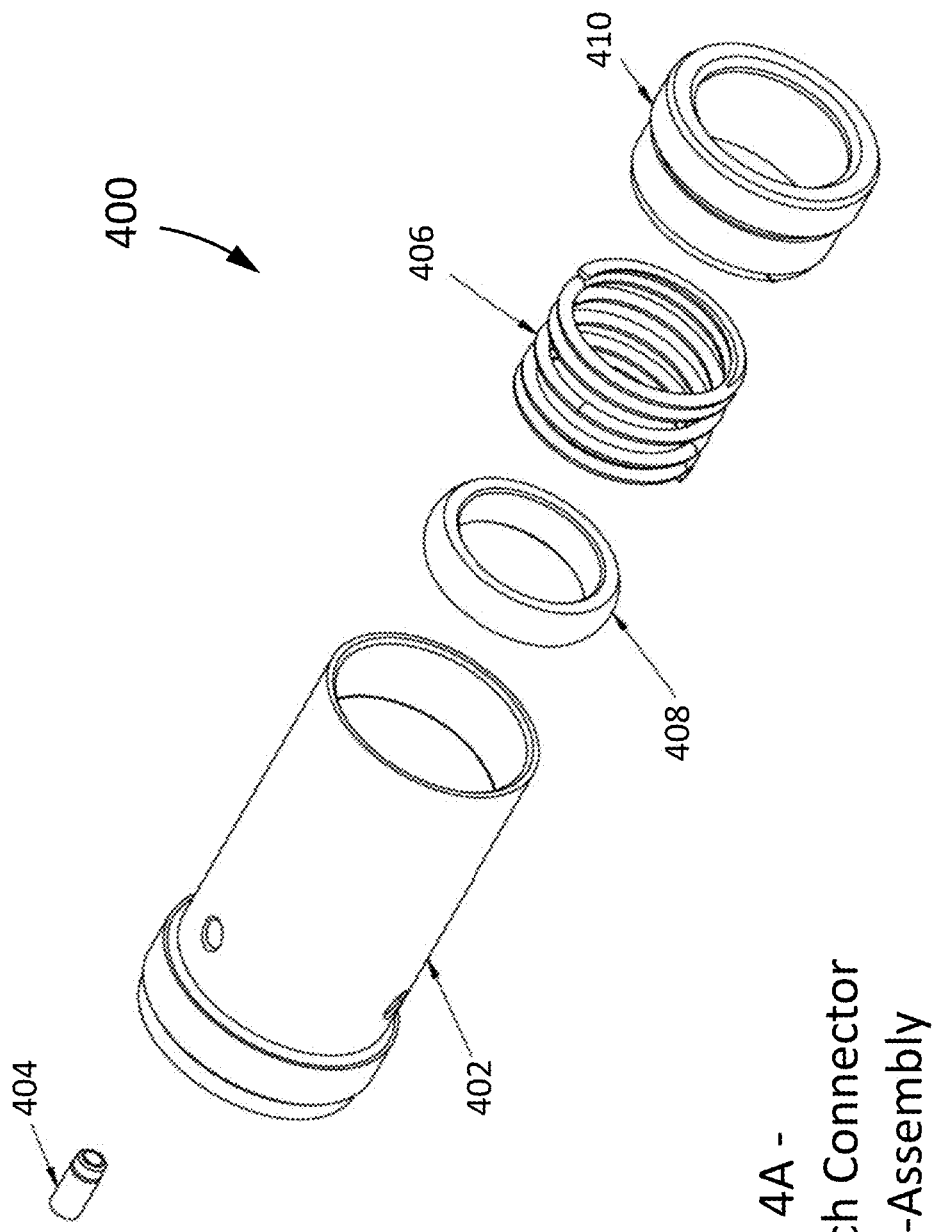
FIG. 4A - Torch Connector Sub-Assembly

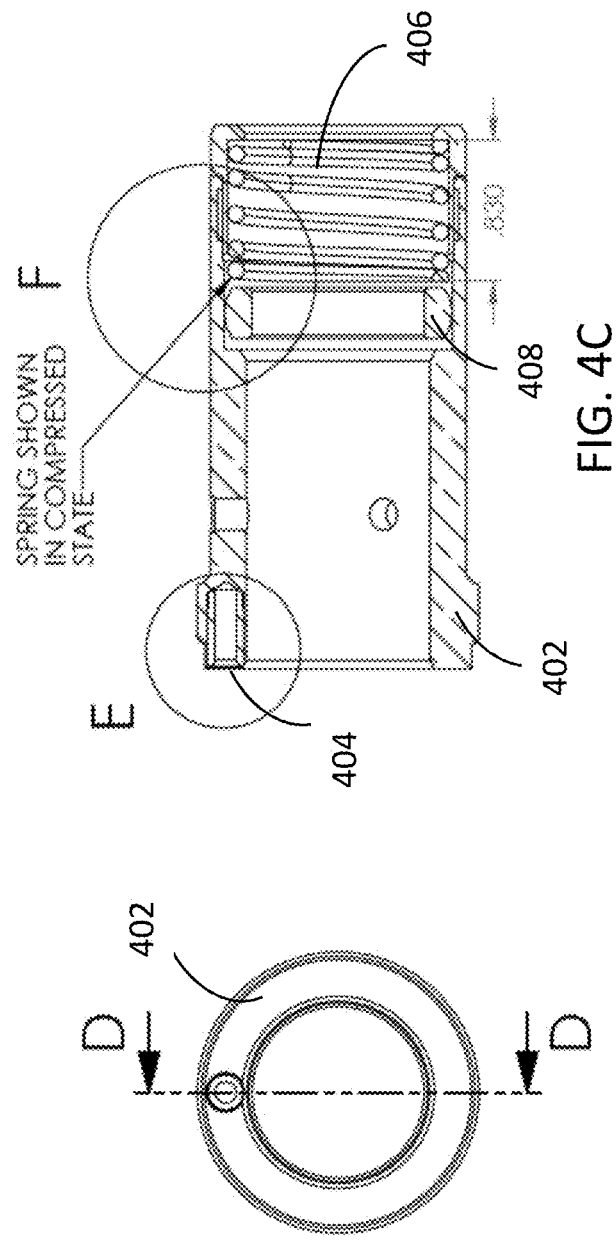
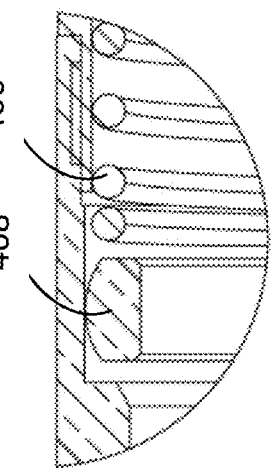
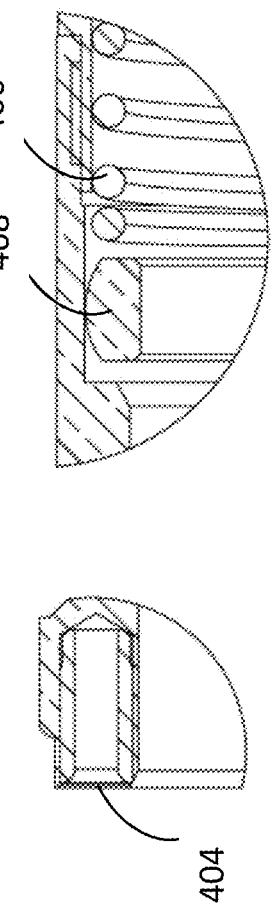
FIG. 4B
FIG. 4C
FIG. 4D ("E" of FIG. 4C)
FIG. 4E ("F" of FIG. 4C)

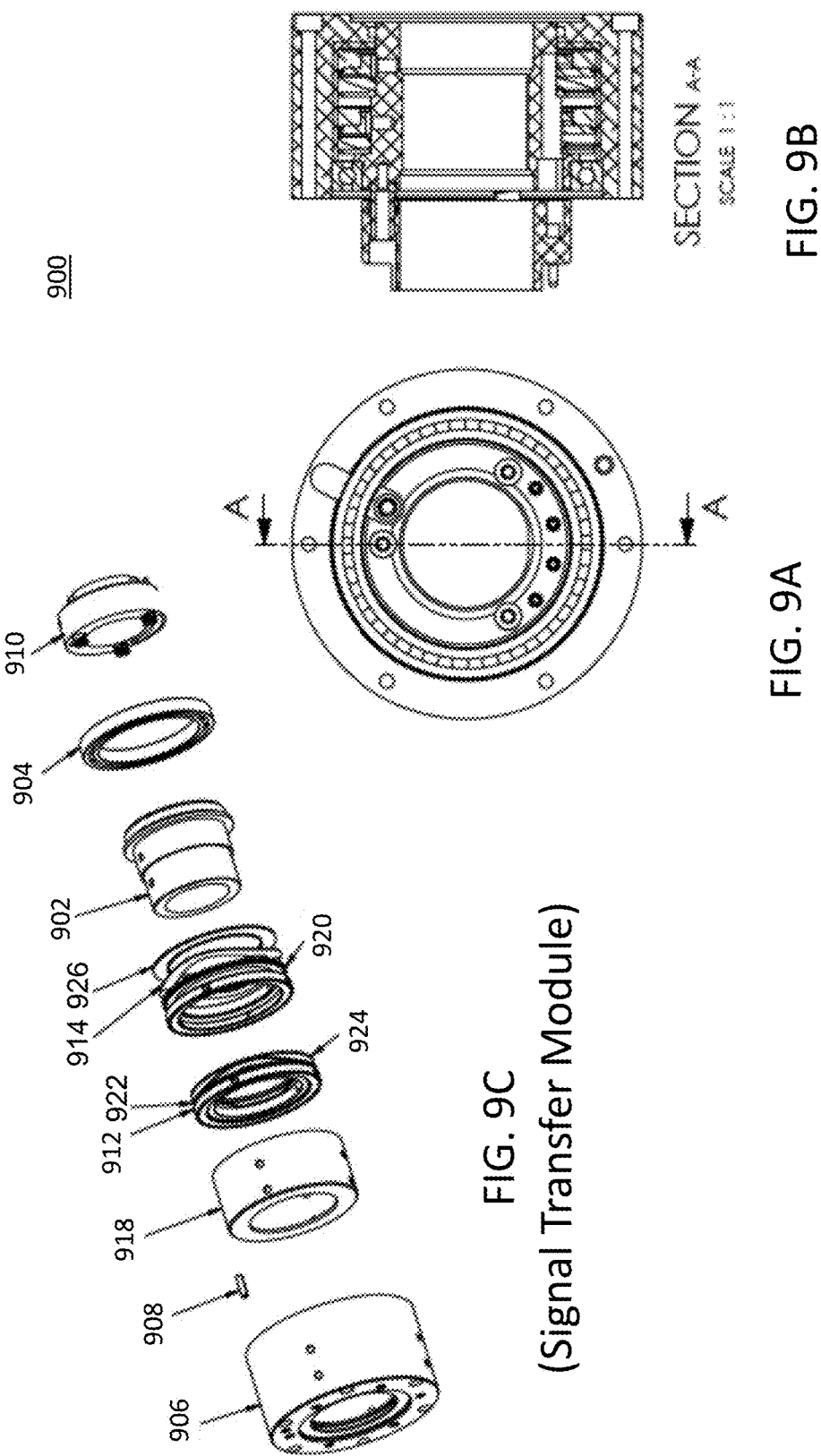

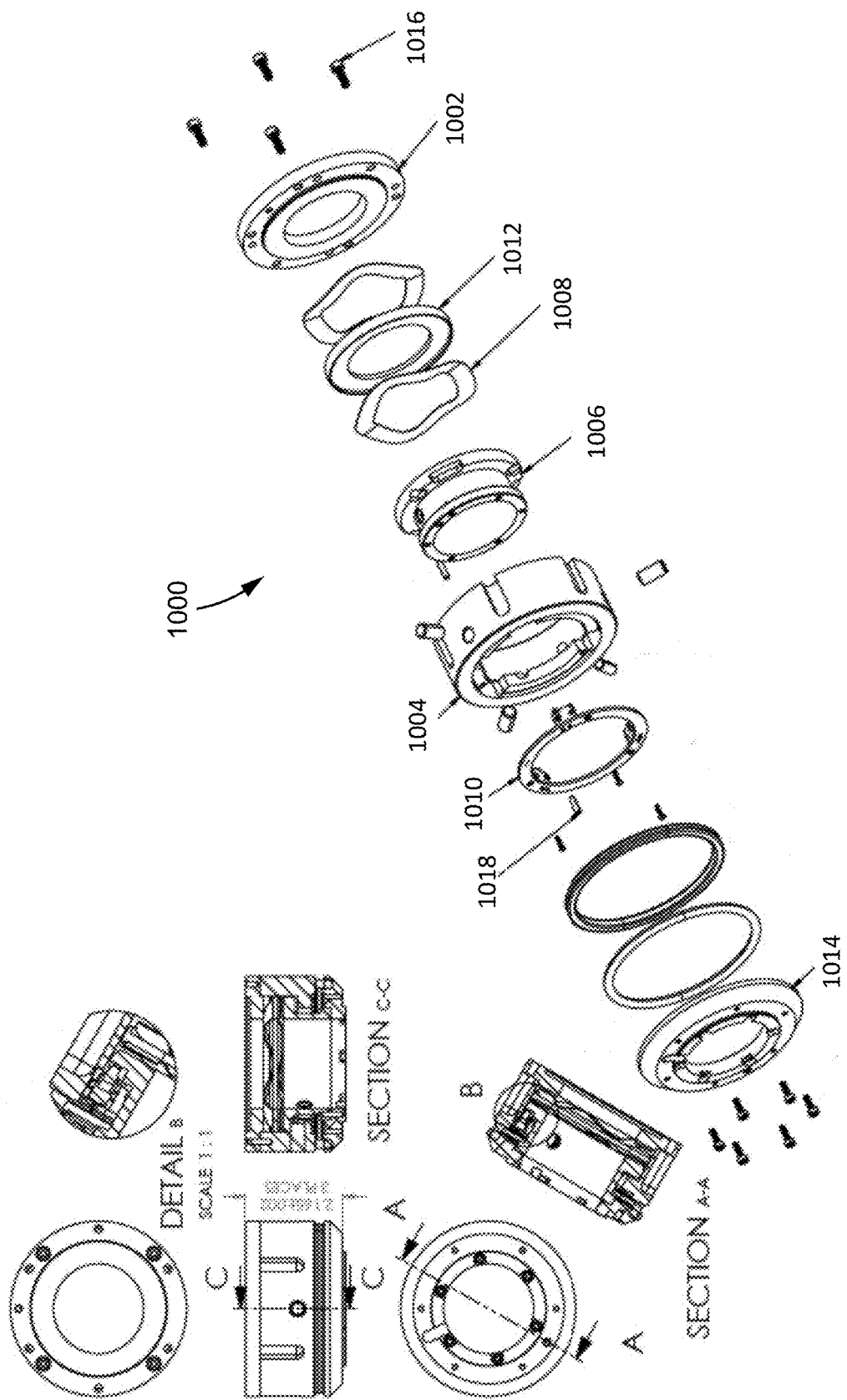
FIG. 10 (Clutch Assembly)

FIG. 11A (Infinite Rotation Shock Sensor)

WELDING TORCH ASSEMBLY DEVICE

FIELD OF INVENTION

The present invention generally relates to welding apparatus, and more particularly to a welding torch and a connection device for providing power to the welding torch.

BACKGROUND OF THE INVENTION

Welding torches for gas metal arc welding are widely used to join separate workpieces. A welding torch device for use in gas metal arch welding generally includes multiple components, such as a welding cable for conveying gas, power and welding wire (electrode), a gas nozzle accommodating a contact tip and designed to feed gas to shield a weld location from contamination, and a neck disposed between the nozzle and the welding cable. The contact tip is used to transfer welding current to the welding wire.

The combination of the components of the welding torch device will affect stability of the welding torch, reliability of the welding performance and maintenance of the welding torch system. In a conventional torch design, there are various issues: for example, a loss of conductivity between the components, which leads to loss of power, and difficulty in arranging the components.

Accordingly, there exists a growing demand for providing a new design to improve welding performance and management of a welding torch.

BRIEF DESCRIPTION OF THE DRAWINGS

These and other features of the invention will become more apparent from the following description in which reference is made to the appended drawings wherein:

FIG. 1A is a cross-section view of an example of a welding torch assembly device;

FIG. 1B is a front view of the welding torch assembly device;

FIG. 1C is a partial cross-section view of the welding torch assembly device shown in FIG. 1;

FIG. 2A is an exploded view of an example of a revolution power connector (RPC) suitable for the welding torch assembly device shown in FIG. 1A;

FIG. 2C is a cross-section view of the RPC;

FIG. 3A is an exploded view of an example of a torch connector assembly suitable for the welding torch assembly device shown in FIG. 1A;

FIG. 4A is an exploded view of an example of a torch connector sub-assembly suitable for the torch connector assembly shown in FIG. 3A;

FIG. 4B is a front view of the torch connector sub-assembly;

FIG. 4C is a cross-section view of the torch connector sub-assembly shown in FIG. 4B taken along the lines D-D;

FIG. 4D is a partial view of the torch connector sub-assembly shown in FIG. 4C;

FIG. 4E is another partial view of the torch connector sun-assembly shown in FIG. 4C;

FIG. 9A is a front view of an example of a signal transfer module suitable for the welding torch assembly device;

FIG. 9B is a cross-section view of the signal transfer module shown in FIG. 9A, taken along the lines A-A;

FIG. 9C is an exploded view of the signal transfer module;

FIG. 10 illustrate an example of a clutch assembly suitable for the welding torch assembly device.

FIGS. 11A-11F illustrate an example of an infinite rotation shock sensor suitable for the welding torch assembly device.

Figure 2B:
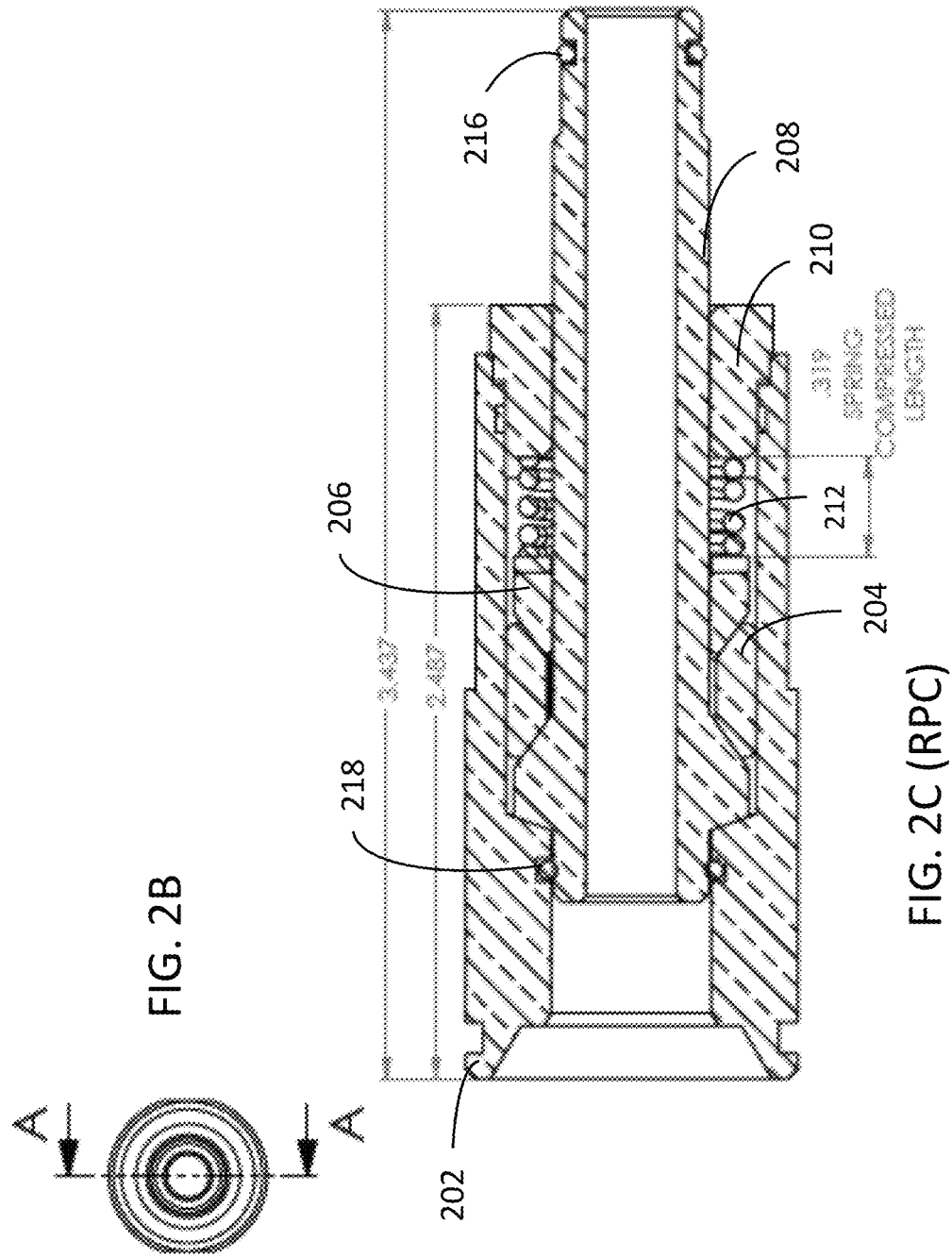
FIG. 2B is a front view of the RPC.
Figure 3C:
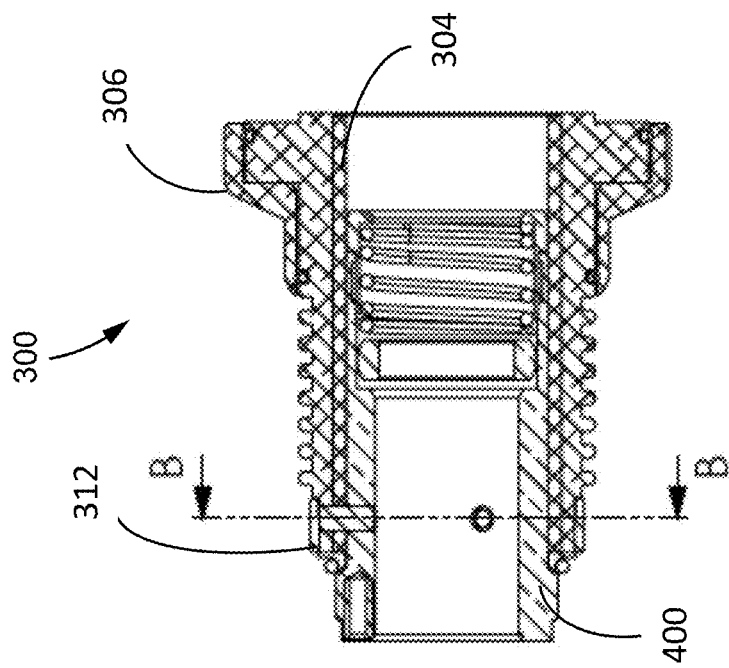
FIG. 3C is a cross-section view of the torch connector assembly shown in FIG. 3B taken along the lines A-A.
Figure 3B:
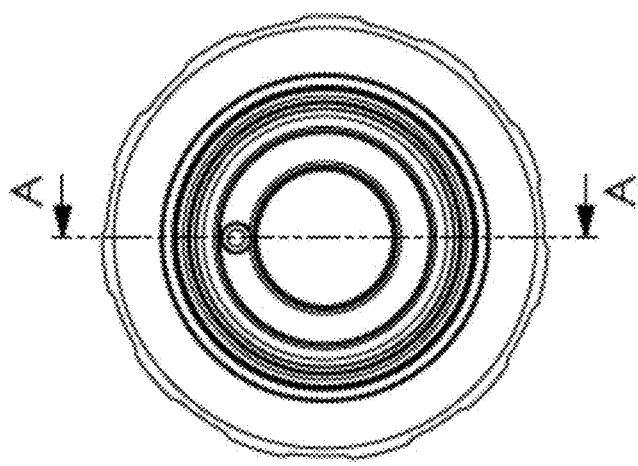
FIG. 3B is a front view of the torch connector assembly.
Figure 3D:
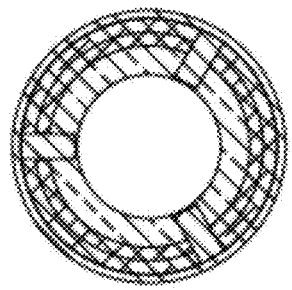
FIG. 3D is a cross-section view of the torch connector assembly shown in FIG. 3C taken along the lines B-B.
Figure 5A:
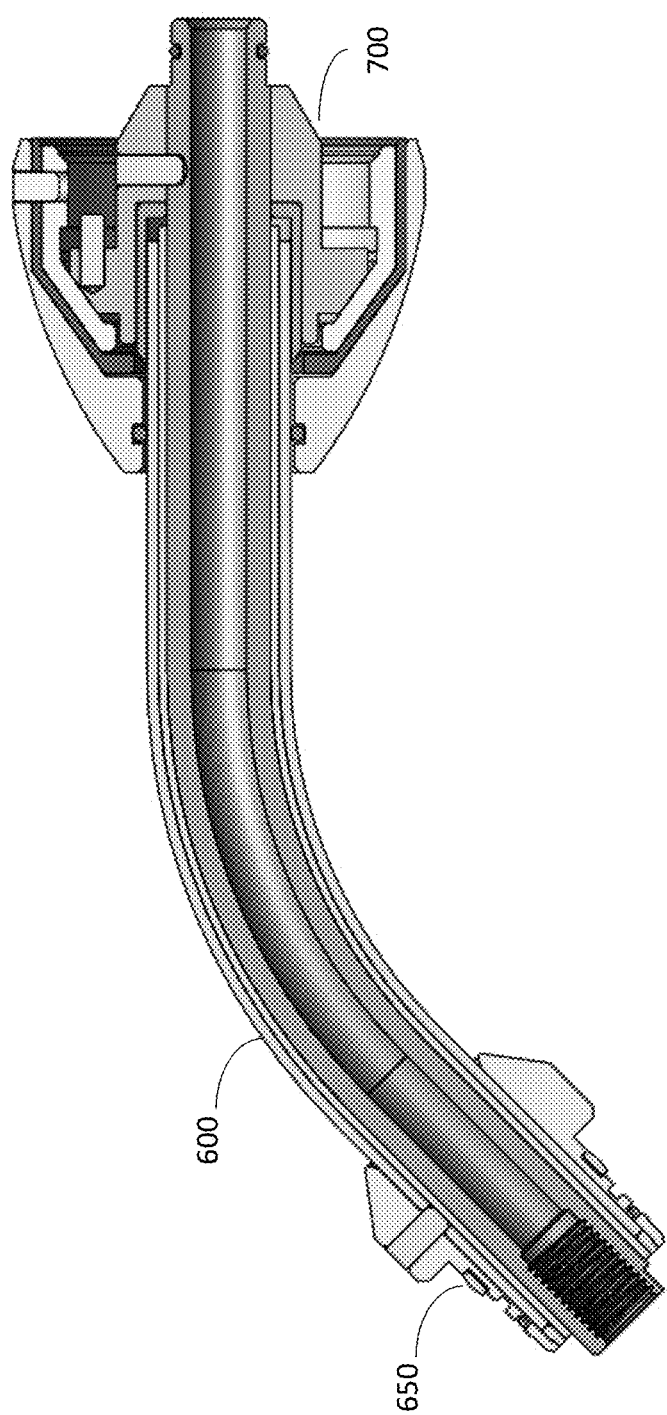
FIG. 5A is a cross-section view of a gooseneck with a handnut, suitable for the welding torch assembly device shown in FIG. 1A.
Figure 5B:
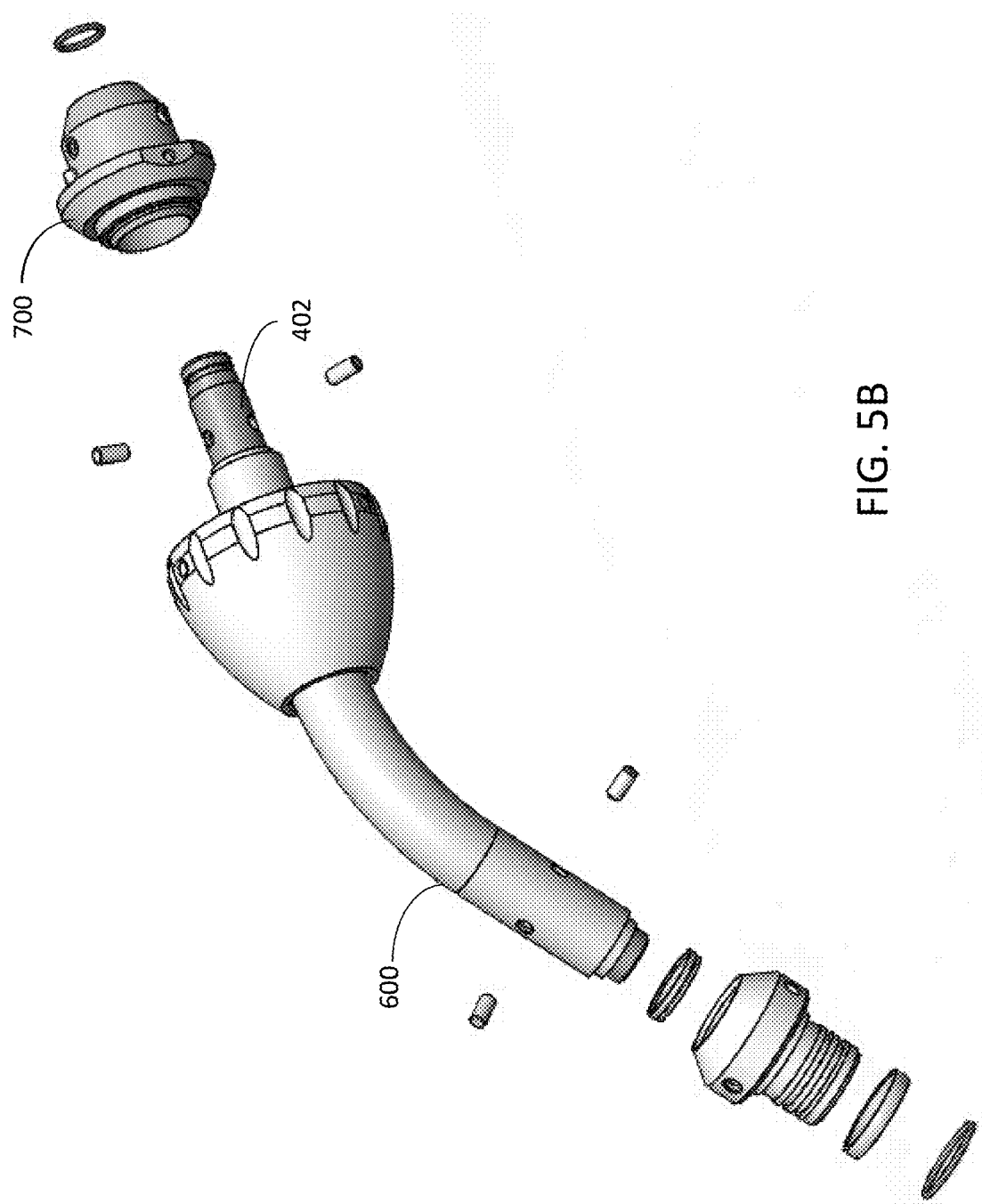
FIG. 5B is a perspective view of the gooseneck together with a torch connector, with the handnut.
Figure 6:
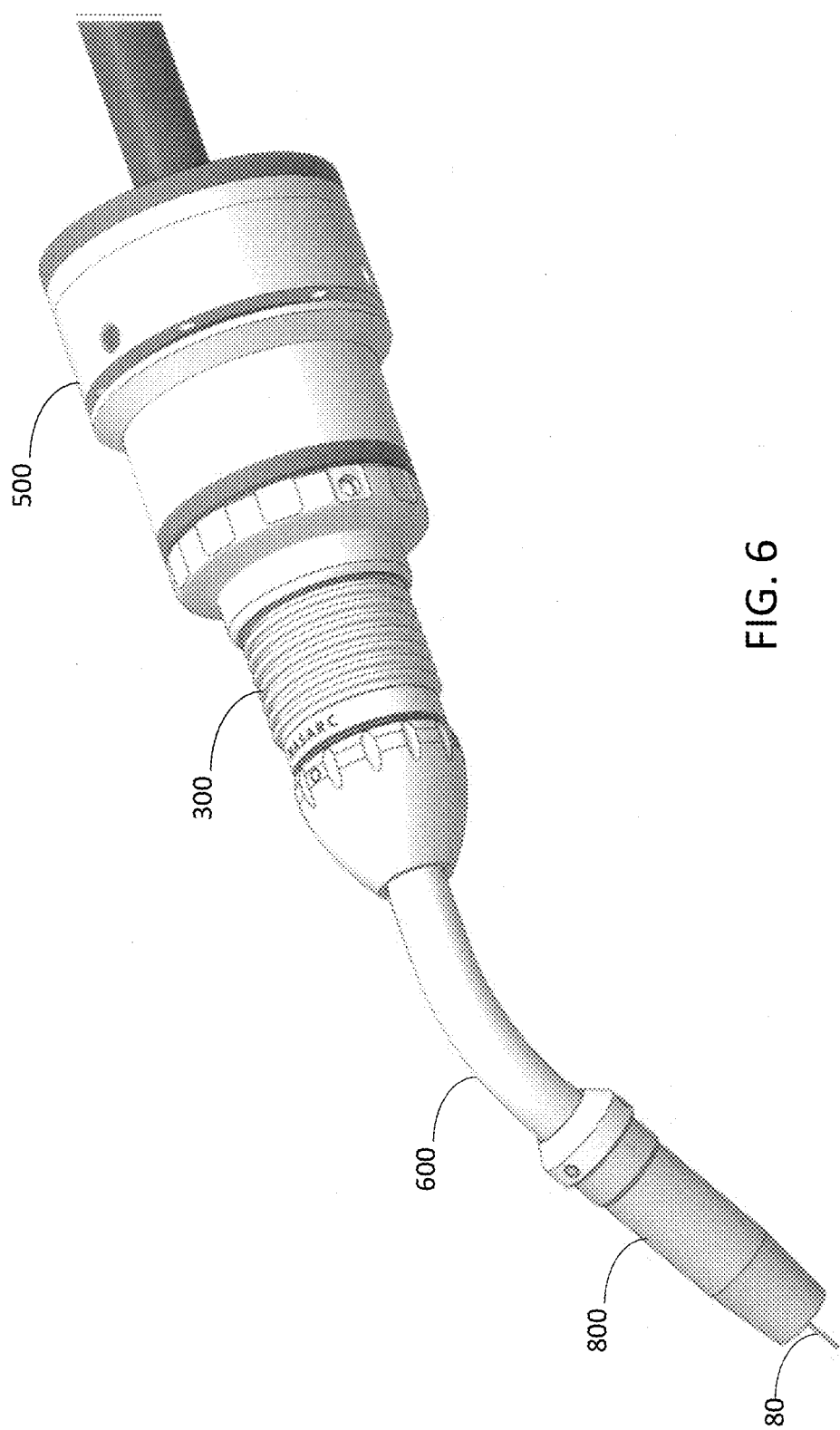
FIG. 6 is a perspective view of the example of the welding torch assembly device.

For simplicity and clarity of the illustration, elements in the figures are not necessarily to scale, they are only schematic and are non-limiting, and the same reference numbers in different figures denote the same elements, unless stated otherwise. In the drawings, some portions of elements are illustrated as transparent for illustration purposes only, unless stated otherwise.

DETAILED DESCRIPTION

Various embodiments are generally related to welding torch assemblies, which are described in detail below by way of example. The examples and figures are illustrative only and not limit the invention.

In this disclosure, the terms "machine", "system", "device", "module", "tool", or "apparatus" may be used herein interchangeably. The machine, system, device, module, tool, or apparatus described herein may be a hardware based system or a combination of the hardware based system and a software based computer system which may include multiple (computer) components or installations operably connected to each other, each of which may include one or more programmable processors, one or more memories, and one or more hardware and/or software based user interfaces.

Referring to the drawings, the embodiments of a welding torch assembly device is described. The welding torch assembly device has various features comprising, for example, but not limited to, the following: a revolution power connector (RPC); a tool-less constant pressure tapered gooseneck connection; a slip-on nozzle connection; and RPC and power cable replacement; and infinite rotation.

Figure 8:
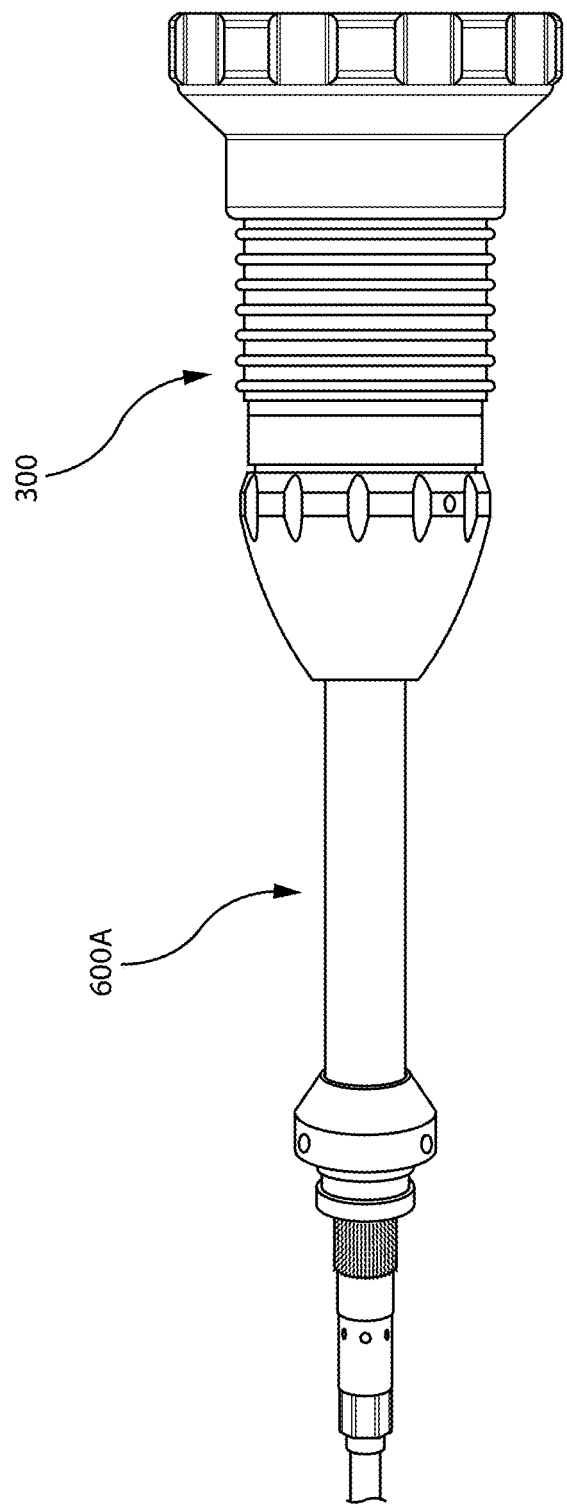
FIG. 8 is a side view of a further example of the welding torch assembly device.
Figure 11B:
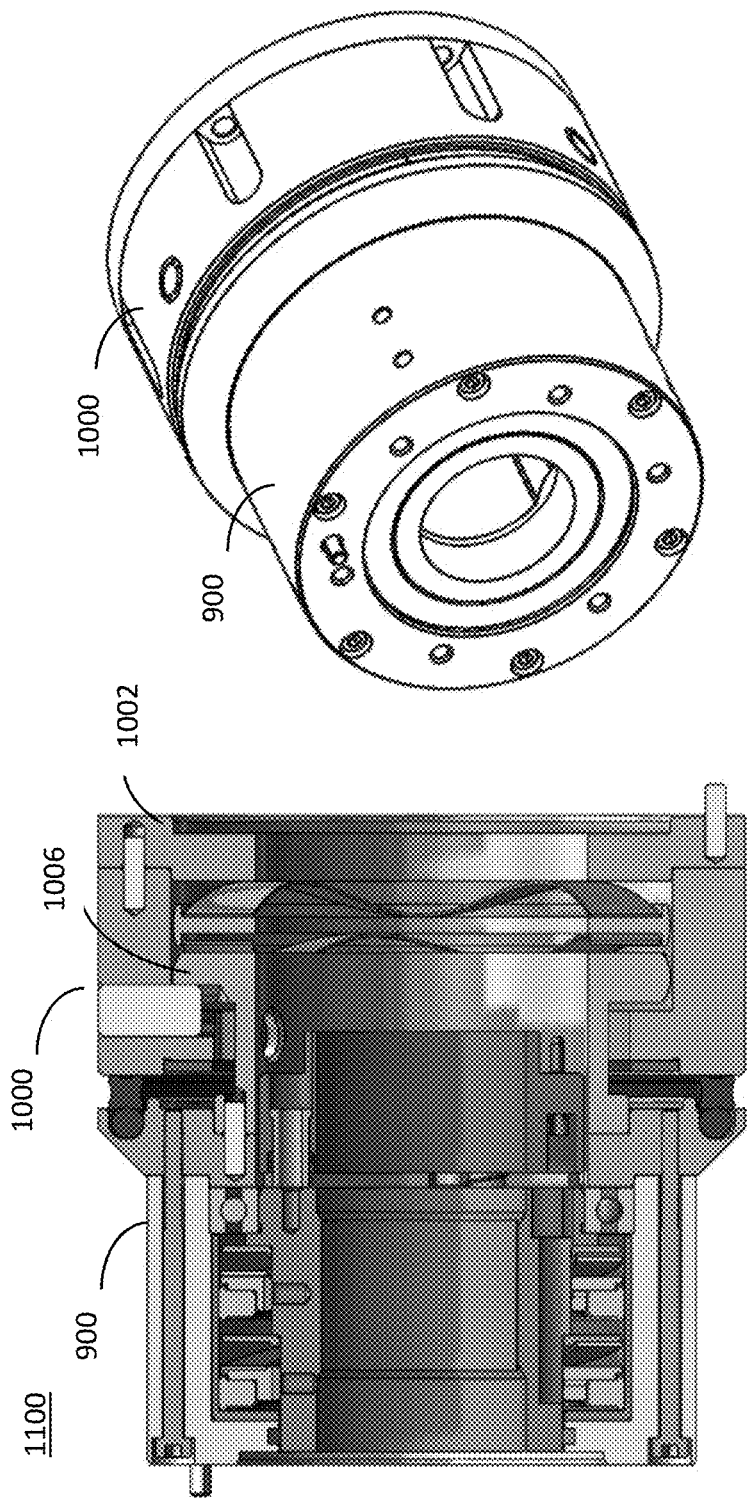
Figure 11C:
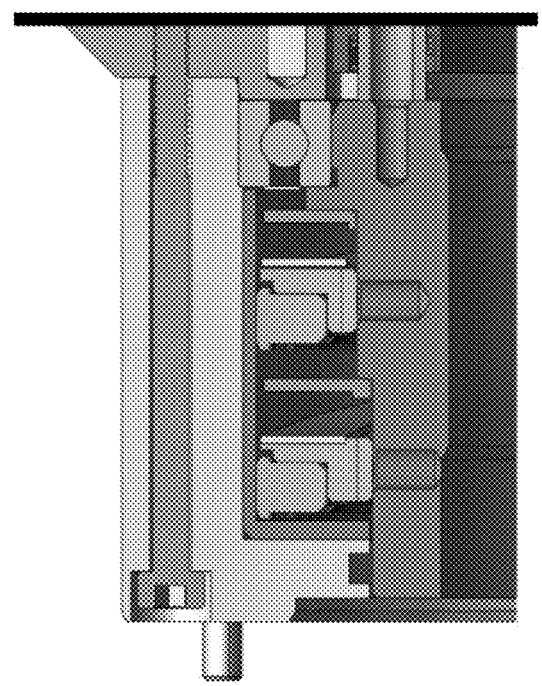
Figure 11D:
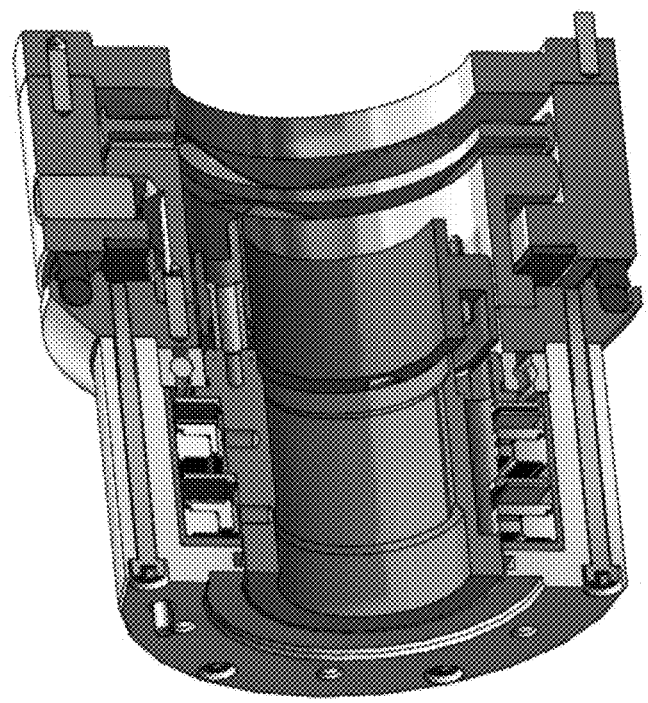
Figure 11E:
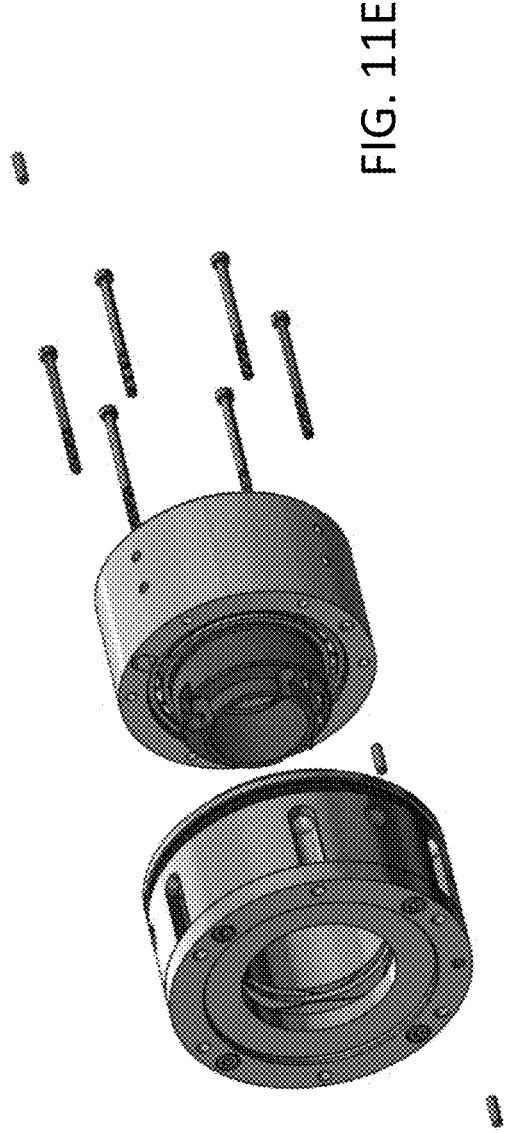
Figure 11F:
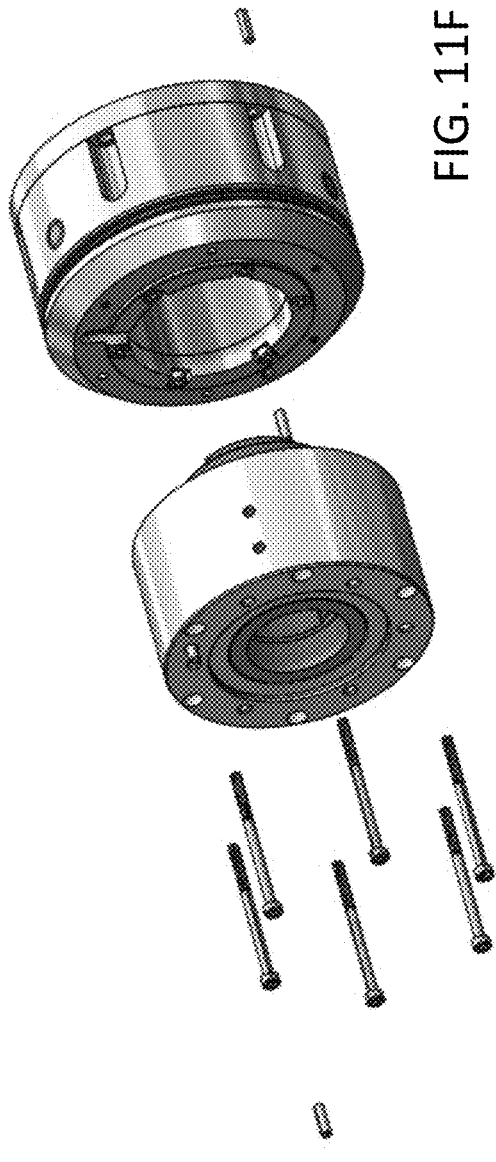
Figure 12A:
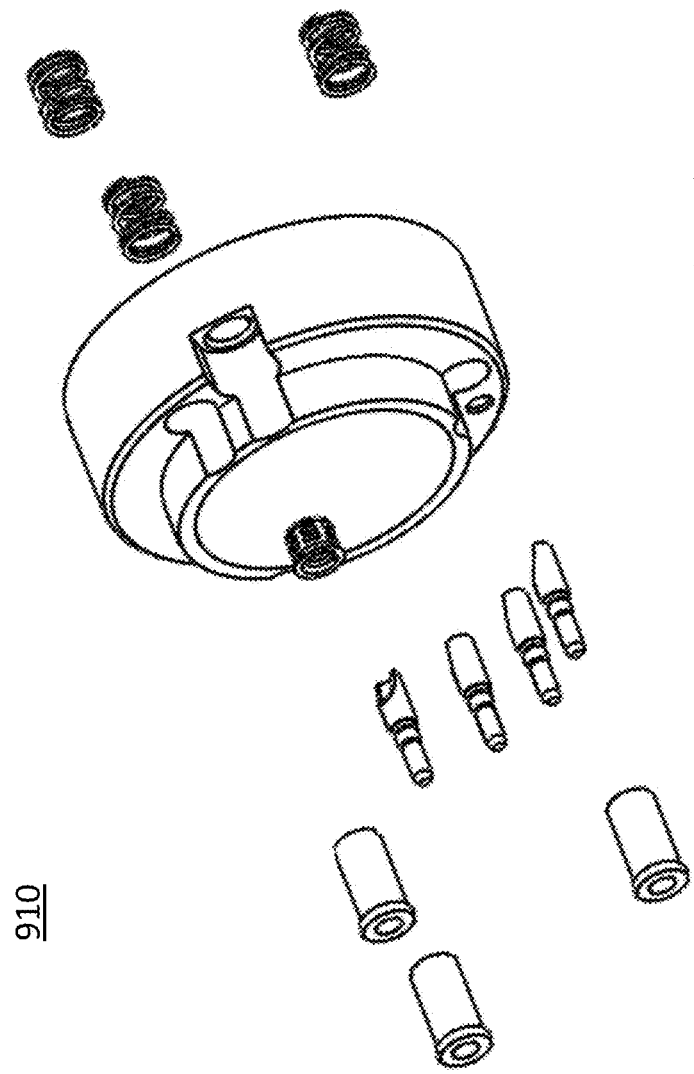
FIGS. 12A-12B illustrate an example of a signal connector suitable for the signal transfer module.
Figure 12B:

The welding torch assembly device 100 comprises a RPC 200, a torch connector assembly 300 with a torch connector sub-assembly 400, an infinite rotation module assembly 1100 with a shock sensor, and a gooseneck 600 assembly with a handnut 700. The welding torch assembly device 100 is detachably coupled to a welding cable 50, which for example, supplies power, gas and a consumable electrode (wire) 80. A welding torch 800 is detachably attached to the gooseneck 600 assembly. The welding torch 800 comprises a removable nozzle 802, a removable contact tip 804 for the wire 80, a diffuser 806, a gas channel 808, and an insert with gas holes 810. The insert is in communication with a channel 620 of the gooseneck 600 assembly. The wire 80 and gas move though the channel 620. In one example, the welding torch assembly device 100 may be used for robotic welding applications. In another example, the welding torch assembly device 100 may be a handheld device. The neck of the welding torch is not limited to that of the gooseneck 600, and a neck 600A shown in FIG. 8 may be used instead. The welding torch assembly 100 device provides many new aspects including a rotating power connection, a dynamic adjustable contact, a clutch design that allows for infinite rotation. The components of the welding torch assembly device 100 are fixed relative to each other using the force of a spring(s).

Revolution Power Connector (RPC)

In one embodiment, the RPC 200 comprises an outer housing 202, rotor contacts 204, a rotor bushing 206, a shaft 208, a bushing nut 210, a spring 212, a pressure plate 214, and O-rings 216, 218. In this illustrated embodiment, the rotor contacts 204 has four contacts. A power cable (from the wire cable 50) is connected to the shaft 208. The RPC 200 has a direct interface with the gooseneck 600 and the power cable of the welding cable 50.

In one embodiment, the RPC 200 is designed so that power is transferred from the shaft 208 to the outer housing 202 through three major current paths (1), (2) and (3).

(1) The primary path is from the internal taper of the shaft 208 to the four (4) rotor contacts 204 which connect to the outer housing 202 radially. The rotor contacts 204 are under constant pressure from the spring 212 through the tapered rotor bushing 204. The tapered surfaces of the shaft 208, rotor contacts 204 and rotor bushing 206 ensure a self-centering and concentric rotation of the rotor contacts 204 with respect to the shaft 208 and the outer housing 202.

(2) The secondary current path is from the outside taper of the shaft 208 to the mating internal tapered surface of the outer housing 202. The tapered surface of the shaft 208 also maintains the concentricity of the shaft 208 with respect to the outer housing 202 and ensures even wear of all mating surfaces for extended life of contacts. This tapered interface automatically centers the shaft 208 for smooth rotation. The tapered interface ensures steady pressure on the O-ring 218 which seals the grease and shielding gas and extends its life.

(3) The third current path is from the bushing nut 210 to the outer housing 202. As the power cable which is connected to the shaft 208 is always pushing the shaft 208 away from the rotational axis at some point due to gravitational forces or stress in the power cable, the clearance between the shaft 208 and the bushing 206 is therefore eliminated at that instance and current can directly flow from the shaft 208 to the outer housing 202.

In one embodiment, the electrical connection created by multiple paths through contact surfaces under constant pressure can transfer more than 400 amperes of current from the shaft 208 to the outer housing 202 with minimum fluctuation or arcing. In one embodiment, materials may be selected for all the parts to ensure minimum resistance and ability to withstand heat and friction.

Tool-Less Constant Pressure Tapered Gooseneck Connection

Figure 7:
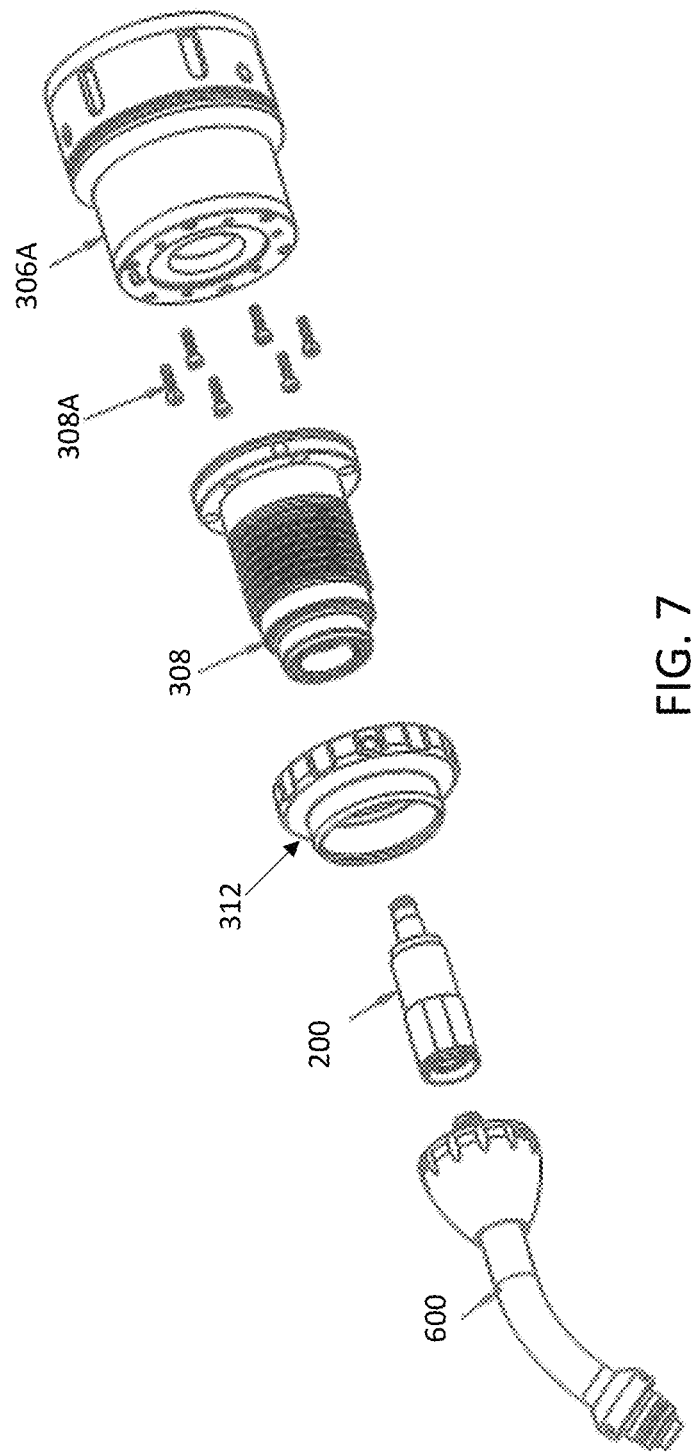
FIG. 7 is an exploded view of another example of the welding torch assembly device.

In one embodiment, the torch connector assembly 300 comprises an insulator ring 302, an insulator sleeve 304, a connector outer housing 306, a dowel 308, an engraved ring 310, an outer ring 312, O-rings 314, 316, 318, and a torch connector sub-assembly 400. The torch connector sub-assembly 400 comprises a torch connector 402, an alignment ring 404, a spring 406, a sliding ring 408, and a spring retainer 410. The torch connector assembly 300 is designed to accommodate the RPC 200 and to be electrically coupled to the gooseneck 600. When assembled, the RPC 200 is positioned in the center of the torch connector 402. A connector outer housing 306A with dowels 308A shown in FIG. 7 may be used instead of the connector outer housing 306 with dowels 308.

The primary electrical interface of the gooseneck 600 is through the RPC 200 positioned in the center of the torch connector 402. The RPC 200 can slide inside the torch connector 402 and is connected directly to the power cable (e.g., the welding cable 50 shown in FIG. 1). The tapered connection automatically centers the RPC 200 and cable assembly and maximizes the surface area of contact. The gooseneck 600 connects to the torch connector 402 by means of the handnut 700. As the gooseneck 600 is inserted into the torch connector 402 it orients itself by means of a dowel. Turning the handnut 700 pushes the gooseneck 600 inside the torch connector 402, which in turn pushes the RPC 200 through the tapered interface against the spring actuated ring 408 located inside the torch connector 402. The spring actuated ring starts to apply pressure on the tapered interface on the last turn of the handnut 700 when the gooseneck 600 is rigidly positioned, and the tapered interface has been engaged. The last complete turn of the handnut 700 transfers the desired spring force on the tapered connection.

The secondary electrical interface is between the gooseneck 600 and the torch connector 402 through the internal conductive threaded portion of the handnut 700. The handnut 700 connects the flange next to the tapered surface of the gooseneck 600 to the conductive threads of the torch connector 402. Current passes from the outer housing 202 of the RPC 200 to the ring 406 inside the torch connector 402. The curved outside surface of the ring 406 transfers the current to the internal conductive potion of the torch connector 402 which is threaded at the front end to engage with the handnut 700 threads.

Both electrical connections are under constant pressure to ensure reliability and resist loosening of threads due to vibration.

The handnut 700 has seals at the front where it slides over the gooseneck 600 and when it fully threads on to the torch connector 402 to prevent spatter from entering the threaded interface and shielding gas to leak from the torch.

Slip-On Nozzle Connection

In one embodiment, a ring 650 has been created with a rounded external profile and a slot to allow overall diametric reduction. A matching profile has been created on the nozzle 802 to interface with the ring 650. The curved profile of the ring 650 allows the nozzle 802 to be changed with minimum wear to extend the life of the nozzle 802. The outer profile of the ring 650 ensures even wear of the nozzle 22 surface and prevents the shielding gas from leaking. It minimizes spatter buildup between the nozzle 802 and the gooseneck 600. This seal is in addition to the dual o-rings on the gooseneck 600 and serves as additional protection in the case where the o-rings are worn and not replaced on time.

RPC and Power Cable Replacement

In one embodiment, a rotating ring on the torch connector 402 allows tool access to the power cable and RPC 200 connection. The RPC 200 or power cable can be individually removed without removing the torch from the robot. The configuration allows unicable replacement. A socket head cap screw is loosened to pull the power cable out from the back of the robot wrist. The same screw is loosened to remove the RPC 200 which just slides out from the front of the torch connector 402 where the gooseneck 600 is connected.

Infinite Rotation

In one embodiment, the welding torch assembly 100 may include a signal transfer module 900. The signal transfer module 900 comprises a rotor 902, a bearing 904, a housing 906, a dowel 908, a signal connector 910, a stator ring 912, a spring 914, an insulator 918, a rear contactor 920, a front contactor 922, a front plate 924, and a rear plate 926.

In one embodiment, the welding torch assembly 100 may include a clutch assembly 1000. The clutch assembly 1000 comprises a pressure plate 1002, a housing 1004, an actuator 1106, a spring 1008, a PCB assembly 1010, a spring retainer 1012, a transition disc 1014, socket head cap screws 1016, and dowels 1018.

In one embodiment, the infinite rotation module assembly 500 may include an infinite rotation shock sensor 1100. The infinite rotation shock sensor 1100 may comprise the signal transfer module 900 and the clutch assembly 1000.

The shock sensor/clutch 1100 is composed of a tubular actuator (e.g., 1006) in the center designed to pass the power cable, shielding gas and sensor signals through the center. The actuator has three profiled surfaces which align with three corresponding dowels in the housing. It is machined with high precision from tool grade steel and is hardened to ensure repeatability of the Tool Center Point of the torch. A spring (e.g., 1008) arrangement with a pressure plate (e.g., 1012) designed to apply the force evenly on the actuator ensures that the profiled surfaces of the actuator are precisely positioned on the dowels. In this example, three normally open switches which are 120 degrees apart on a plane perpendicular to the axis of the actuator, are connected in series on an insulated base and pressed against the actuator in a manner that they are just closed in normal operating conditions. The housing is connected to the robot mounting face with a breakaway electrical isolation disc. The actuator is mounted to the welding torch. A slight movement of the actuator in any axis with respect to the housing, causes one or more of the switches to open and the robot to come to a stop.

The signal from the switches (Shock Sensor signal) is transferred to the signal transfer module 900 which has two sets of conductive sliding rings, composed of the stator ring 912, the contactor ring 920/922, the spring 914 and the pressure plate 924/926. The signal from the shock sensor goes to the stator ring 912 from where it is transferred to the front and rear contactors 920, 922. The Stators are assembled to the outer housing 906 with the insulator 918 between them for electrical isolation. The contactors are attached to the rotor 902 which is made from electrically insulative material. The contactors are designed to maintain good electrical contact, concentricity with the stators and ability to withstand wear for extended life. The signal from the contactors goes to a connector which connects to the cable assembly from where it connects to the robot controller.

The connector 910 on the rotor 902 is designed to adjust with the movement of the power cable assembly each time the gooseneck is connected or removed. The shaft of the RPC 200 is rigidly connected to the power cable assembly and they both move slightly with the spring force acting on them through the profiled ring in the torch connector. The connector 910 has a spring force acting on it which keeps it in position and it is able to slide on three bushings to automatically adjust each time when the gooseneck is inserted or removed, to maintain the signal connection with the robot controller.

While one or more embodiments have been provided in the present disclosure, it may be understood that the disclosed systems and methods may be embodied in many other specific forms without departing from the scope of the present disclosure. The present examples are to be considered as illustrative and not restrictive, and the intention is not to be limited to the details given herein. For example, the various elements or components may be combined or integrated in another system or certain features may be omitted, or not implemented. A number of variations and modifications can be made without departing from the scope of the invention as defined in the claims.

What is claimed is:

1. A welding torch assembly device comprising:
   an exterior housing having a bore,
   an insulator sleeve positioned within the bore of the exterior housing,
   a first connector at least partially positioned within the insulator sleeve and secured to the exterior housing, the first connector having a bore; and
   a second connector slidably positioned within the bore of the first connector and configured to directly interface with a cable the first connector configured to provide a tapered connection for automatically centering the second connector and the cable.

2. The welding torch assembly device according to claim 1, further comprising:
   a handnut, a neck assembly being connected to the first connector via the handnut.

3. The welding torch assembly device according to claim 1, wherein the second connector comprises:
   an outer housing having an internal tapered surface;
   a shaft configured to connect to the cable and insertable into the outer housing, the shaft having an outside tapered surface;
   a rotor contact on the shaft and connected to the outer housing and being under constant pressure,
   a bushing nut; and
   a spring.

4. The welding torch assembly device according to claim 3, wherein the second connector provides a first current path from the outside tapered surface of the shaft to the rotor contact, a second current path from the outside tapered surface of the shaft to the internal tapered surface of the outer housing, and a third current path from the bushing nut to the outer housing.

5. The welding torch assembly device according to claim 1, further comprising:
   an infinite rotation shock sensor comprising a clutch assembly.

6. The welding torch assembly device according to claim 5, wherein the infinite rotation shock sensor further comprises a signal transfer module.

7. The welding torch assembly device according to claim 6, wherein the signal transfer module is configured to receive a signal from one or more switches and transfer the signal to stop operation of a welding torch.

8. The welding torch assembly device according to claim 7, wherein the clutch assembly comprises an actuator and the one or more switches disposed on an insulated base and pressed against the actuator.

9. The welding torch assembly device according to claim 1, wherein the first connector is configured to detachably attach a neck assembly to a welding torch.

10. The welding torch assembly device according to claim 1, wherein a first electrical interface of a neck assembly is through the second connector positioned in the first connector.

11. The welding torch assembly device according to claim 2, wherein the handnut comprises a threaded portion and is configured to push the neck assembly inside the first connector when turned.

12. The welding torch assembly device according to claim 11, further comprising a spring actuated ring located inside the first connector, wherein pushing the neck assembly inside the first connector pushes the second connector against the spring actuated ring.

13. The welding torch assembly device according to claim 11, wherein a second electrical interface is provided between the neck assembly and the first connector through the threaded portion of the handnut.

14. The welding torch assembly device according to claim 1, said welding torch assembly being a handheld device.

15. The welding torch assembly according to claim 1, combined with a robot for robotic welding.

16. A welding torch assembly device comprising:
a first connector;
a second connector configured to directly interface with a cable and be positioned in a center of the first connector, the first connector having a tapered connection configured to automatically center the second connector and the cable; and
an infinite rotation shock sensor comprising a clutch assembly and a signal transfer module configured to receive a signal from one or more switches and transfer the signal to stop operation of a welding torch.

17. The welding torch assembly device according to claim 16, wherein the clutch assembly comprises an actuator and the one or more switches disposed on an insulated base and pressed against the actuator.

18. A welding torch assembly device comprising:
a first connector;
a second connector configured to directly interface with a cable and be positioned in a center of the first connector, the first connector having a tapered connection configured to automatically center the second connector and the cable;
a handnut having a threaded portion; and
a neck assembly being connected to the first connector via the handnut,
wherein the handnut is configured to push the neck assembly inside the first connector when turned and a second electrical interface is provided between the neck assembly and the first connector through the threaded portion of the handnut.

* * * * *